UNITED STATES PATENT OFFICE.

LEO H. BAEKELAND, OF YONKERS, NEW YORK.

COATED OBJECT AND METHOD OF MAKING THE SAME.

982,230.

Specification of Letters Patent. Patented Jan. 24, 1911.

No Drawing.

Application filed November 22, 1909. Serial No. 529,377.

*To all whom it may concern:*

Be it known that I, LEO H. BAEKELAND, a citizen of the United States, residing at Yonkers, in the county of Westchester and State of New York, have invented certain new and useful Improvements in Coated Objects and Methods of Making Same, of which the following is a specification.

The insoluble, infusible condensation products of phenols and formaldehyde have been proposed as a protective coating for articles like pipes, tanks, bolts and other pieces of machinery. It has been proposed to apply these substances as incomplete reaction products of phenols and formaldehyde, with or without suitable condensing agents, which by proper application of heat, or heat and pressure, can be transformed into the insoluble, infusible condensation products.
This method, simple as it appears, has many serious disadvantages, which considerably curtail its practical applications. For instance, during the final transformation into the insoluble, infusible product, or polymerization, there is a considerable reduction of volume, which results in shrinkage, so that there is a very decided surface tension, which produces either cracks or checking or lack of adherence, to such an extent that the objects are imperfectly covered, or the original surface becomes exposed in time. Furthermore, a shock or knock may produce cracking or chipping of the surface. In order to avoid this undue shrinkage and in order to insure more perfect adherence, I distribute stresses by interposing, before the act of polymerization, such materials as do not contract, and yet will act as protecting agents as long as they are held together by the binding mass of infusible condensation products of phenols and formaldehyde.

The shrinkage of the unmixed condensation product in undergoing polymerization is appr. ximately one per cent., and is sufficient in the case of a layer applied to metal to produce such stresses as may induce cracking or separation. By incorporating certain inert materials this contraction is reduced proportionately to the amount of inert materials used. Furthermore, the stresses are distributed more evenly, occurring only in those portions of the binding material which lie between adjacent particles of filling material. For example, a composition consisting of 60 parts of a partial condensation product of phenol and formaldehyde intimately associated with 40 parts of ground flint and 2 parts of fine asbestos, has been found to be free from the objections before referred to.

In order to carry out my invention, I can utilize any incomplete condensation product of phenols and formaldehyde, which is transformable into the final insoluble, infusible condensation product of phenols and formaldehyde. But before applying it on the surface, I mix with it an inert fibrous, cellular, granular, or pulverulent substance, as for instance, finely ground asbestos, glass, sand, emery, corundum, graphite, clay, cornish stone, oxid of iron, or other similar suitable substances. Or again, I can very advantageously use for this purpose, in case it is desired to avoid the addition of foreign materials, the final insoluble, infusible condensation product itself, preliminarily reduced to powder and mixed with the partial condensation product as described above, and which can be transformed into the final insoluble, infusible condensation product.

In my process, I may apply the partial condensation products in the form of a varnish, by adding to them a suitable amount of a volatile solvent, which thus facilitates distribution and drying. In whatever way the application has been made, the hardening of the protective coating, or transformation into the insoluble, infusible condensation product, is carried out by the known means, for instance, the application of heat, or the application of heat and pressure.

For metallic objects it may be preferable to submit them first to a "pickling" or acid treatment, so as to start out with a clear unoxidized metallic surface.

Instead of applying the partial condensation products in liquid form, they can be applied in solid or pulverized form by dusting on or any other suitable means, then afterward melting them on to the surface which has to be protected.

In all above mentioned methods, the hardening can be accelerated by the addition of suitable condensing agents, as for instance, acids, salts or bases.

In the above specification, as well as in the following claims, the word "phenols" is meant to designate not only the first member of the phenol group, but its homologues and isomers, or phenolic bodies, or mixtures thereof, which are equivalent in this reaction; in the same way, the polymers of formaldehyde, or other substances which engender formaldehyde, may be used as an equivalent to formaldehyde.

In order to reduce or modify the peculiar odor of these condensation products, suitable bodies may be added.

I claim:—

1. As a new article of manufacture, a metallic or other object the surface of which is protected by a layer consisting of an insoluble and infusible condensation product of phenol and formaldehyde containing a finely-subdivided inert material distributed through the condensation product in proportion to reduce the shrinking stresses of this layer to a degree sufficient to insure adherence of the layer.

2. A method of protecting metallic or other objects from the influence of chemicals and atmospheric agents, which consists in applying to the surface of said objects, a layer containing a partial condensation product of phenols and formaldehyde, transformable into the final insoluble and infusible condensation products of phenols and formaldehyde, in conjunction with a filling material which reduces the shrinking stresses occurring during the hardening process, and finally hardening this layer by suitable means.

In testimony whereof, I affix my signature in presence of two witnesses.

LEO H. BAEKELAND.

Witnesses:
H. S. TARBELL,
MARY L. SHORT.